(12) United States Patent
Sato

(10) Patent No.: US 6,223,971 B1
(45) Date of Patent: May 1, 2001

(54) DRIVING UNIT OF A WELDING EQUIPMENT

(75) Inventor: Yoshio Sato, Ayase (JP)

(73) Assignee: Obara Corporation, Ayashe (JP)

( * ) Notice: Subject to any disclaimer, the term of this patent is extended or adjusted under 35 U.S.C. 154(b) by 0 days.

(21) Appl. No.: 09/533,561

(22) Filed: Mar. 22, 2000

(30) Foreign Application Priority Data

Nov. 24, 1999 (JP) ................................................. 11-332624

(51) Int. Cl.⁷ ........................ B23K 37/047; B23K 15/013
(52) U.S. Cl. .................................................. 228/45; 228/12
(58) Field of Search ........................... 228/45, 12, 234.1; 310/80; 74/127

(56) References Cited

U.S. PATENT DOCUMENTS 5,549,015 * 8/1996 Aiso et al. .
5,966,988 * 10/1999 Aiso et al. .

FOREIGN PATENT DOCUMENTS

| 644 014 | 3/1995 | (EP) . |
| 7-290251 | 11/1995 | (JP) . |
| 9-144834 | 6/1997 | (JP) . |
| 3042268 | 7/1997 | (JP) . |
| 11-197843 | 7/1999 | (JP) . |

\* cited by examiner

Primary Examiner—Patrick Ryan
Assistant Examiner—Jonathan Johnson
(74) Attorney, Agent, or Firm—Flynn, Thiel, Boutell & Tanis, P.C.

(57) ABSTRACT

A small-sized motor is employed by a driving unit of a welding equipment wherein the inner diameter of a rotary shaft of the motor can be reduced as much as possible, and the entire length of the driving unit is reduced. The driving unit of a welding equipment is provided with a pressure application shaft. The pressure application shaft is driven by a motor including a hollow rotary shaft, a screw shaft fixed inside the rotary shaft, and a nut provided integrally with or substantially integrally with the pressure application shaft, the nut being screwed with a screw provided on the screw shaft. The rotary shaft of the motor is substantially coaxially positioned with the screw shaft. Outer diameters of the nut and pressure application shaft are respectively smaller than an inner diameter of the rotary shaft to form a direct moving guide part. The direct moving guide part is movable on an inner periphery surface of the rotary shaft and a rotary force of the rotary shaft of the motor is converted into a reciprocating motion.

20 Claims, 4 Drawing Sheets

DRIVING UNIT OF A WELDING EQUIPMENT

BACKGROUND OF THE INVENTION

1. Field of the Invention

The invention relates to a driving unit of a welding equipment capable of converting a rotary output of a motor into reciprocating motion of a pressure application shaft so that the pressure application shaft can operate a gun arm or a welding jig.

2. Related Art

There is a conventional driving unit of a welding equipment, as disclosed, for example, in Japanese Patent Laid-Open Publication No. 11-197843. This driving unit of a welding equipment includes a pressure application shaft that is driven by a motor and has a portion to be pulled in the motor, a shaft of a rotor (rotary shaft) of the motor formed of a hollow shaft, a screw shaft fixed inside the rotary shaft at one end thereof, and a nut fixed to the end of the pressure application shaft and screwed with a screw provided in the screw shaft so that the pressure application shaft and the nut are movable on the inner peripheral surface of the rotary shaft.

However, in the conventional driving unit of a welding equipment, since the diameter of the nut fixed to the end of the pressure application shaft is larger than that of the pressure application shaft, the diameter of the rotary shaft or hollow shaft is larger than the diameter of the nut, so that the diameter of the motor becomes larger, and a difference in level is formed between the outer periphery of the pressure application shaft and that of the nut. As a result, bearings of the pressure application shaft can not slide on the portion close to the difference in level therebetween so that a part of the pressure application shaft is not utilized as a direct moving guide part, resulting in increasing the length of the pressure application shaft.

SUMMARY OF THE INVENTION

The invention has been made in view of the problems of the conventional driving unit of a welding equipment, and it is a first object of the invention to provide a driving unit of a welding equipment capable of reducing the inner diameter of a rotary shaft of a motor as much as possible so as to employ a small-sized motor, and also capable of reducing the entire length of the driving unit of the welding equipment.

It is a second object of the invention to provide a driving unit of a welding equipment capable of not only reducing the length of the pressure application shaft but also rendering the driving unit of the welding equipment to be reduced in length and small-sized in size by disposing a bearing of a direct moving guide part of the pressure application shaft on the front wall part of the motor so that the direct moving guide part of the pressure application shaft can slide on the inner surface of the bearing.

It is a third object of the invention to provide a driving unit of a welding equipment capable of easily fixing a screw shaft to a rotary shaft by use of fixed means utilizing a friction force without requiring a troublesome operation such as shrinkage fit or cold shrinkage fit.

It is a fourth object of the invention to provide a driving unit of a welding equipment capable of moving a pressure application shaft to a desired standby position when a motor is troubled by forming a machining part for manually turning the screw shaft at the rear end side of the screw shaft.

PREFERRED EMBODIMENT OF THE INVENTION

Figure 1:
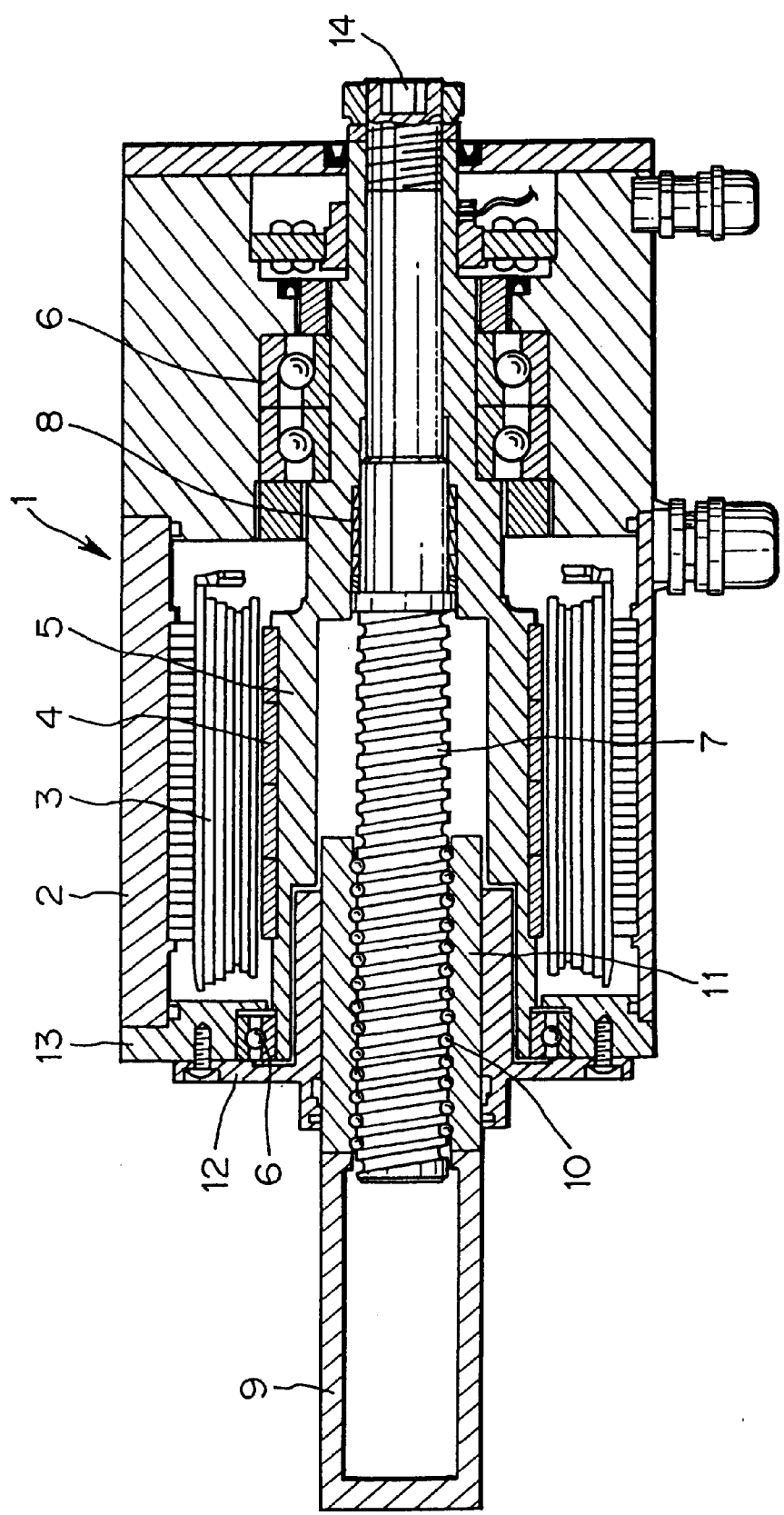
FIG. 1 is a sectional view of a driving unit of a welding equipment according to a first embodiment of the invention.

First Embodiment (FIG. 1):

In FIG. 1, a servomotor 1 comprises a winding 3 of a stator that is fixed to an outer shell 2, a rotor magnetic pole 4 disposed at the inner periphery of the winding 3, and a rotary shaft 5 to which the rotor magnetic pole 4 is fixed, wherein the rotary shaft 5 is formed of a hollow shaft and is supported by the outer shell 2 of the servomotor 1 by way of bearings 6. A ball screw shaft 7 is positioned at a shaft core of the servomotor 1 and is fixed to the rotary shaft 5 by fixed means 8.

A ball nut 11 having a screw for indirectly engaging with a screw of the ball screw shaft 7 by way of balls 10 is fixed to a rear end of a pressure application shaft 9 by screwing or welding.

The rotary shaft 5 of the motor 1 and the ball screw shaft 7 are coaxially aligned with each other. The front part of the pressure application shaft 9 can be extended from the servomotor 1 and the tip end thereof can be connected to an electrode (not shown) for applying pressure to and welding a workpiece in a C-type gun, or to a connection member (not shown) connecting to a gun arm in an X-type gun, or to a workpiece placing table (not shown) in a welding jig.

Entire or most part of the pressure application shaft 9 and ball nut 11 are uniformly formed at their outer diameters which are respectively slightly smaller than the inner diameter of the hollow rotary shaft 5. The pressure application shaft 9 having a part that is pulled in the servomotor 1 and a direct moving guide part formed of the ball nut 11 move on the inner peripheral surface of the rotary shaft 5.

In the driving unit of a welding equipment having the construction set forth above, the pressure application shaft 9 is extended from the servomotor 1 at the maximum in a state shown in FIG. 1. When the pressure application shaft 9 is pulled in the servomotor 1 in this state, a three-phase ac current is supplied to the winding 3 of the stator of the servomotor 1 so that the rotor magnetic pole 4 is excited to turn the rotary shaft 5, whereby the ball screw shaft 7 fixed to the rotary shaft 5 starts its turning. Since the ball nut 11 moves along the ball screw shaft 7 as the ball screw shaft 7 is turned, the pressure application shaft 9 integrated with the ball nut 11 is subsequently pulled in the servomotor 1 while it moves on the inner peripheral surface of the rotary shaft 5 together with the ball nut 11 so that the amount of the extension of the pressure application shaft 9 from the servomotor 1 is reduced.

Inasmuch as the first embodiment is constructed in that the ball screw shaft 7 is fixed inside the rotary shaft 5, the ball nut 11 screwed with the ball screw shaft 7 is fixed to the end of the pressure application shaft 9, and the outer diameters of the pressure application shaft 9 and ball nut 11 are made smaller than the inner diameter of the rotary shaft 5 to form the direct moving guide part, and the direct moving guide part is movable on the inner peripheral surface of the rotary shaft 5. As a result, the inner diameter of the rotary shaft 5 can be remarkably reduced while the length of the pressure application shaft 9 extending from the servomotor 1 can be reduced.

A bearing 12 is fixed to and positioned at a front wall 13 constituting the outer shell 2 of the servomotor 1 and serves as the bearing of the direct moving guide part of the pressure application shaft 9, and it is positioned inside the servomotor 1 at the part thereof. The direct moving guide part of the pressure application shaft 9 is slidable on the inner surface of the bearing 12 while it is baffled, and the inner diameter of the rotary shaft 5 is slightly larger than that of the bearing 12.

With the construction set forth above, not only the length of the pressure application shaft 9 can be reduced but also the length and the size of the driving unit of a welding equipment can be reduced and small-sized compared with the conventional driving unit of a welding equipment having bearings in the midway of the pressure application shaft positioned in front of a servomotor.

It is possible to easily fix the ball screw shaft 7 to the rotary shaft 5 by the ring-shaped fixed means utilizing a friction force employing a friction effect caused by a wedge or by fixed means utilizing a friction force caused by power lock without requiring a troublesome operation such as shrinkage fit or cold shrinkage fit.

It is also possible to move the pressure application shaft 9 at a desired standby position by turning the ball screw shaft 7 when turning a handle (not shown) that is mounted on a machining part 14 in the case of trouble of the driving unit if the machining part 14 such as machining holes or machining projections for manually turning the ball screw shaft 7 is provided at the rear end of the ball screw shaft 7.

Although in the first embodiment set forth above, a servomotor is employed as a motor, it is needless to say that a well-known motor such as stepping motor, an inverter motor, a reluctance motor or the like may be employed as the motor. Further, the combination of a ball screw and a ball nut is not always employed for screwing a screw and a nut but the combination of well-known screws and nut may be properly employed.

Still further, a screw for the nut may be integrally formed on the inner periphery of the pressure application shaft 9 at the end thereof instead of fixing the ball nut 11 relative to the pressure application shaft 9 by screwing or welding. In the latter modification, it is possible to expect substantially the same function and operation as the first embodiment but the number of parts of the component can be reduced.

Figure 2:
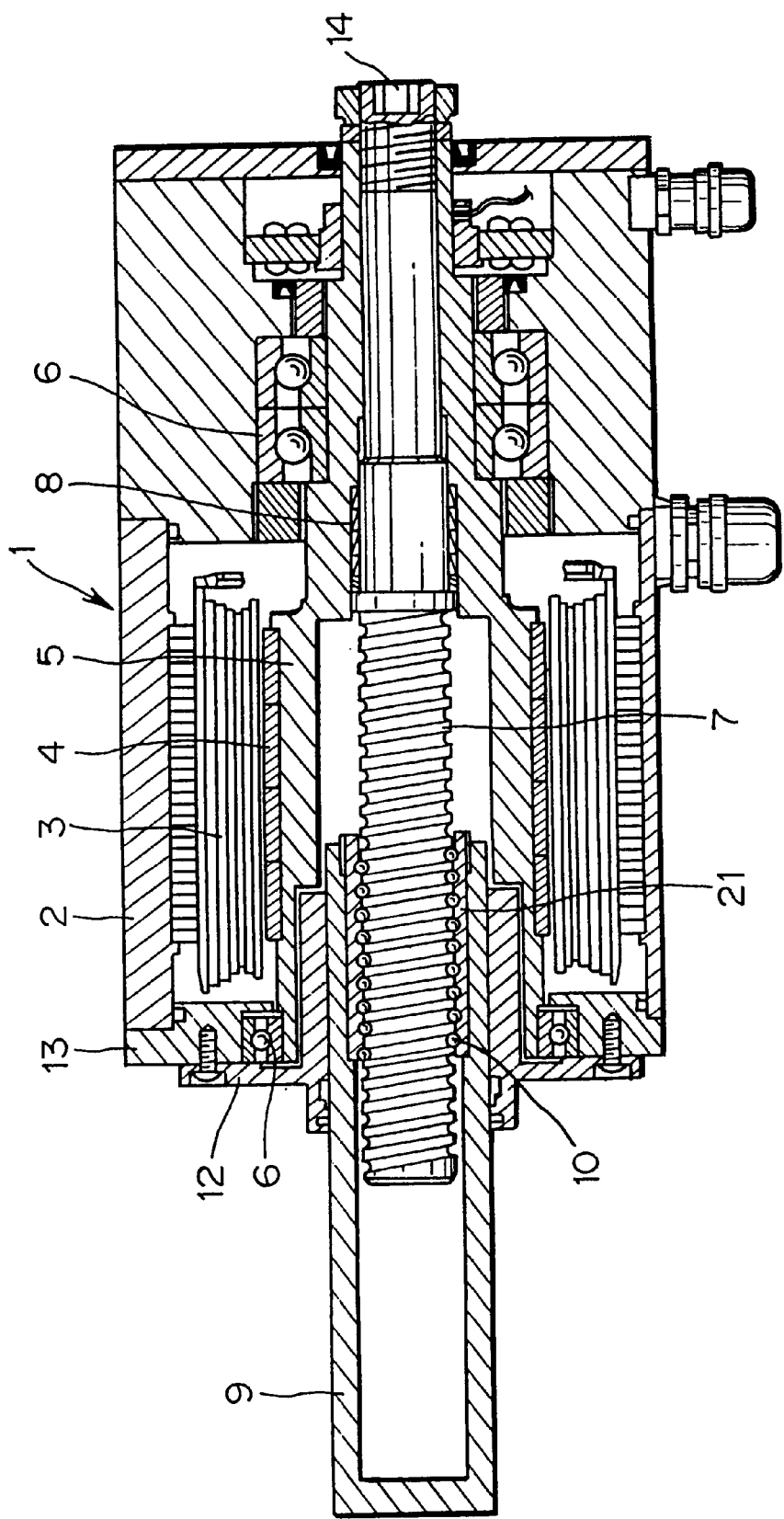
FIG. 2 is a sectional view of a driving unit of a welding equipment according to a second embodiment of the invention.

Second Embodiment (FIG. 2):

A driving unit of a welding equipment according to a second embodiment is described next. The driving unit of a welding equipment is substantially the same as that of the first embodiment except that a ball nut 21 is integrally fixed to the pressure application shaft at the inner peripheral portion of other pressure application shaft 9. Accordingly, the explanation of other components of the driving unit of a welding equipment is omitted in the second embodiment but depicted by the same reference numerals.

Although a ball screw shaft 7 is turned when a servomotor 1 turns in the second embodiment, the ball nut 21 moves along the ball screw shaft 7 as the ball screw shaft 7 is turned so that the pressure application shaft 9 integrated with the ball nut 21 is subsequently pulled inside the servomotor 1 while it moves along the inner peripheral surface of a rotary shaft 5 together with the ball nut 21 so that the amount of extension of the pressure application shaft 9 from the servomotor 1 is reduced.

Inasmuch as the second embodiment is constructed that the ball screw shaft 7 is fixed inside the rotary shaft 5, the ball nut 21 screwed with the ball screw shaft 7 is fixed to the end of the pressure application shaft 9, and the outer diameters of the pressure application shaft 9 and ball nut 21 are made smaller than the inner diameter of the rotary shaft 5 to form the direct moving guide part, and the direct moving guide part is movable on the inner peripheral surface of the rotary shaft 5. As a result, the inner diameter of the rotary shaft 5 can be remarkably reduced while the length of the pressure application shaft 9 extending from the servomotor 1 can be reduced.

Figure 3:
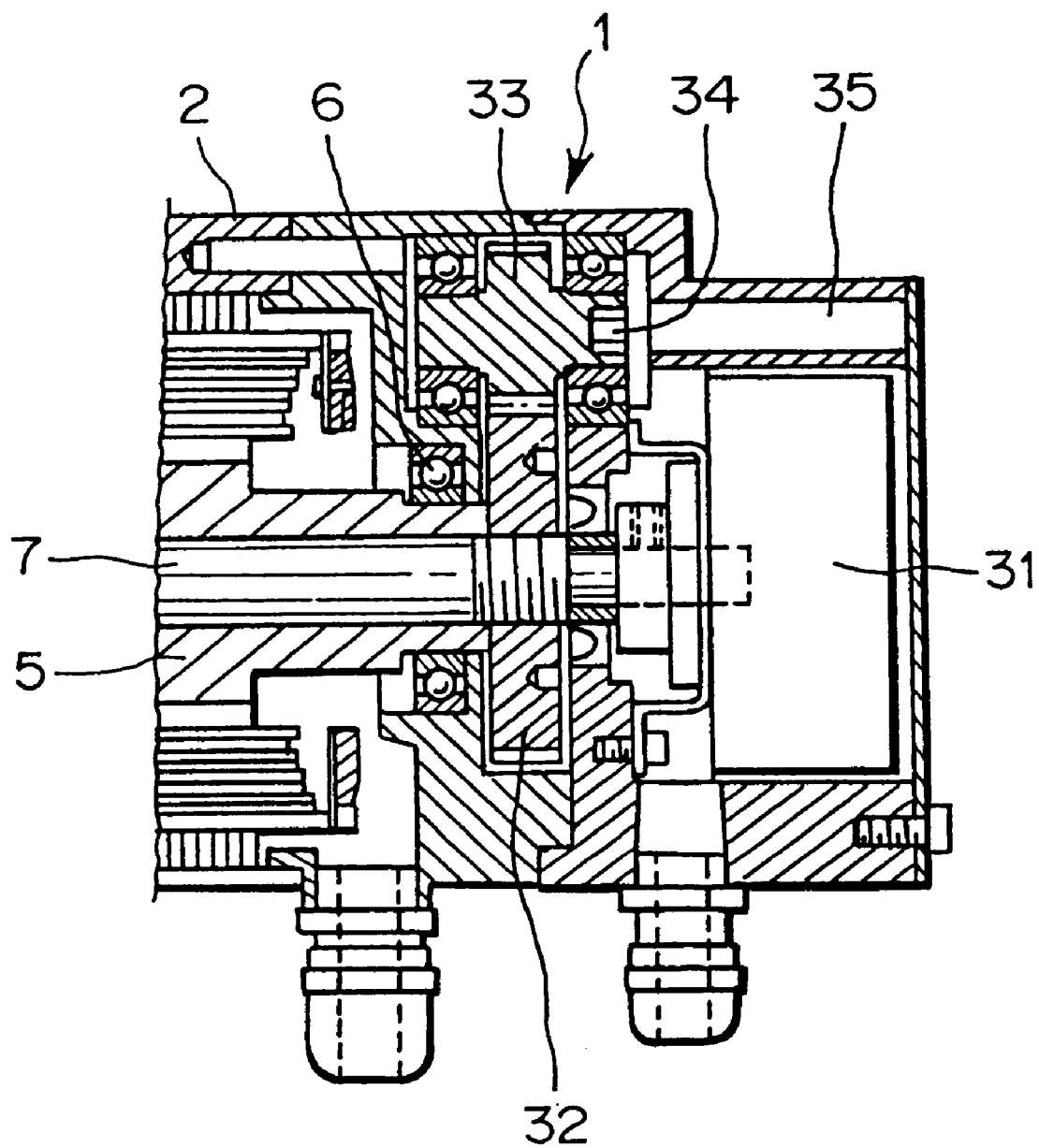
FIG. 3 is sectional view of a driving unit of a welding equipment according to a third embodiment of the invention, particularly a view showing the detail of a machining part thereof that can be operated by a manually operating handle for manually operating the driving unit.
Figure 4:
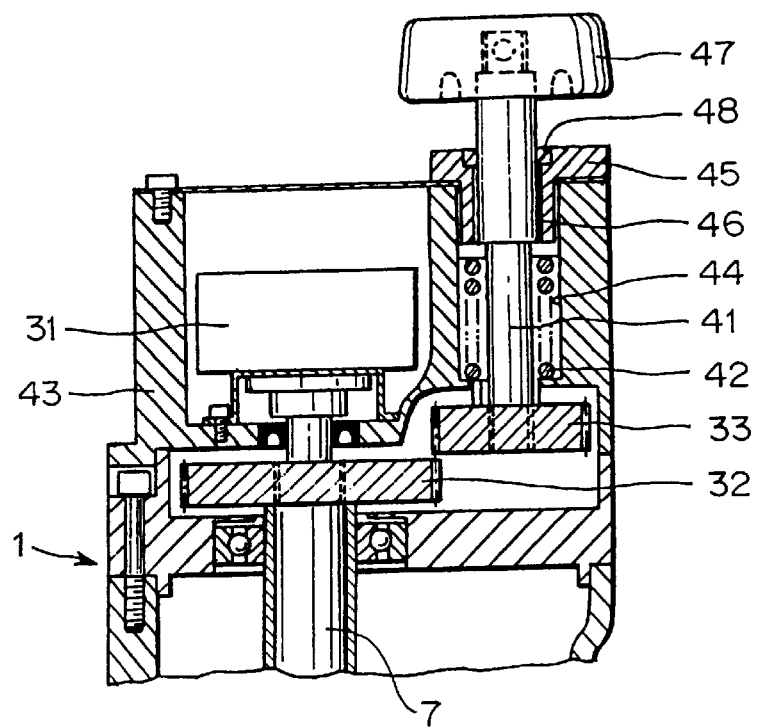
FIG. 4 is sectional view of a driving unit of a welding equipment according to a fourth embodiment of the invention, particularly a view showing the detail of a machining part thereof that can be operated by a manually operating handle for manually operating the driving unit.
Figure 5:
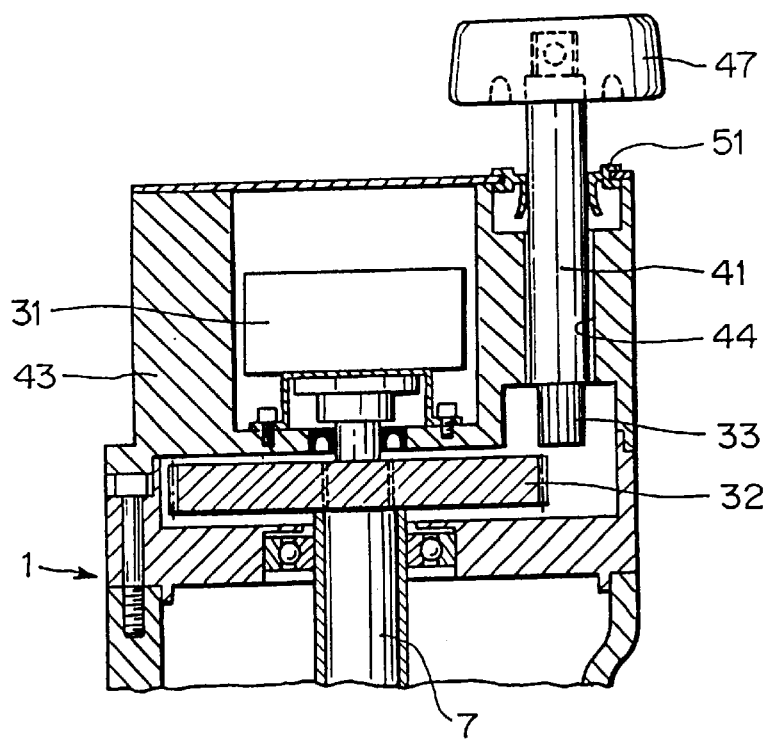
FIG. 5 is sectional view of a driving unit of a welding equipment according to a fifth embodiment of the invention, particularly a view showing the detail of a machining part thereof that can be operated by a manually operating handle for manually operating the driving unit.

Although the machining part 14 that is positioned at the end of the ball screw shaft 7 for manually turning the ball screw shaft 7 is described in the first and second embodiments, there are following modifications as shown in FIGS. 3 to 5.

Third Embodiment (FIG. 3):

A driving unit of a welding equipment according to a third embodiment is described next.

A rotary shaft 5 of a servomotor 1 is formed of a hollow shaft and it is supported by an outer shell 2 of the servomotor 1 by way of bearings 6. A ball screw shaft 7 positioned at the shaft core of the servomotor 1 is fixed to the rotary shaft 5 by power lock means or the like, and the ball screw shaft 7 is extended further rearward from the body of the servomotor 1 and is connected to a position detector 31.

Attached to the ball screw shaft 7 is a relatively large diameter gear 32 that forms a driven part for transmitting the torque of the servomotor 1 and is positioned between the front of the position detector 31 and the rear of the body of the servomotor 1. Positioned at the portion that is eccentric from the turning central shaft of the servomotor 1 is a relatively small diameter gear 33 that forms a manually operating driving part for applying the torque of the servomotor 1 to the gear 32 of the driven part, wherein the gears 32 and 33 mesh directly with each other. The gears 32 and 33 may be connected with each other by way of a serrated toothed belt (not shown).

A machining part 34 is provided on the gear 33 of the driving part and it is formed of manually operable machining holes or machining projections or the like. The gear 33 may be operated by a handle or the like by way of manual operating holes 35.

In the case where a trouble occurs in the motor or the operation system of the welding equipment to disable the reciprocated motion of the pressure application shaft, a manually operating handle (not shown) is mounted on the machining part 34 formed in the gear 33 of the driving part and it is turned to turn the ball screw shaft 7 by way of the gears 32 and 33, so that the pressure application shaft 9 performs the reciprocal motion whereby the pressure application shaft 9 is moved to a desired standby portion.

Meanwhile, since electronic components or the like are generally disposed on the entire back surface of the position detector 31 that is positioned coaxially with the servomotor 1, the ball screw shaft 7 hardly penetrates the position detector 31. However, according to the invention, the gear 32 of the driven part for transmitting the torque of the servomotor 1 is formed on the rotary central shaft of the servomotor 1 between the position detector 31 and the rear of the body of the servomotor 1 without providing the ball screw shaft 7 that penetrates the position detector 31 while the gear 33 for applying the torque of the servomotor 1 to the gear 32 is positioned at the portion eccentric from the rotary shaft of the servomotor 1. As a result, the gear 33 can be easily provided so that the driving unit becomes compact as a whole.

Fourth Embodiment (FIG. 4):

A driving unit of a welding equipment according to a fourth embodiment is described next. In the fourth embodiment shown in FIG. 4, a gear 33 of a driving part for driving a gear 32 of a driven part for transmitting the torque of a servomotor 1 is positioned at a standby position when the servomotor 1 is operated. That is, a returning spring 42 formed of an elastic body is biased in a guide shaft 41 for holding and guiding the gear 33, and forms a standby unit. The guide shaft 41 is positioned in a hole 44 formed in a housing 43 of a position detector 31 and it is journaled by a bearing 46 of a bearing holding member 45 that is screwed in the entrance of the hole 44. Depicted by 47 is a manually operating knob and 48 is a dust seal.

In the fourth embodiment, the gear 33 is normally on standby at the upper portion in FIG. 4 by the returning spring 42 serving as a standby unit and it does not mesh with the gear 32 so that it is not tuned when the servomotor 1 operates. However, when the pressure application shaft does not perform a reciprocal motion, the manually operating knob 47 is first pressed against the biasing force of the returning spring 42 so that the gear 33 meshes with the gear 32. When the manually operating knob 47 is then turned to turn the gear 33 of the driving part, the ball screw shaft 7 is turned by way of the gears 32 and 33 so that the pressure application shaft performs a reciprocal motion, resulting in the movement of the pressure application shaft to a desired standby position.

Since the gear 33 is not turned when the motor normally turns so that wasting energy consumption can be reduced.

Fifth Embodiment (FIG. 5):

A driving unit of a welding equipment according to a fifth embodiment is described next. In the fifth embodiment shown in FIG. 5, a gear 33 of a driving part for driving a gear 32 of a driven part for transmitting the torque of a servomotor 1 is pulled off from a housing 43 of a position detector 31 when the servomotor 1 operates. That is, the diameter of a guide shaft 41 is slightly made larger than that of the gear 33 and the diameter of a hole 44 is formed in the manner that the guide shaft 41 can pass through the hole 44 together with the gear 33. A notched cover 51 formed of rubber is positioned at the entrance of the hole 44 for closing the entrance of the hole 44 so that a foreign matter such as dust is prevented from entering the hole 44 when the gear 33 is removed from the motor 1.

In this fifth embodiment, the gear 33 in normally taken out from the motor 1 by a manually operating knob 47 so that the gears 32 and 33 do not mesh with each other, and hence the gear 32 merely runs idle when the motor 1 operates.

As mentioned above, when the pressure application shaft can not perform the reciprocating motion, the gear 33 is first inserted into the hole 44 using the manually operating knob 47 to permit the gear 33 to mesh with the gear 32. Then, when the gear 33 is turned by turning the manually operating knob 47, the ball screw shaft 7 is turned by way of the gears 32 and 33 to permit the pressure application shaft to perform the reciprocating motion so that the pressure application shaft can be moved to an desired standby position.

Also in the fifth embodiment, since the gear 32 merely runs idle when the motor normally operates, wasting energy consumption is reduced.

Since the driving unit of a welding equipment comprises a rotary shaft of the motor formed of a hollow shaft, a screw shaft fixed inside the rotary shaft, a nut being provided integrally with or substantially integrally with the pressure application shaft, said nut being screwed with a screw provided on the screw shaft, wherein the rotary shaft of the motor is substantially coaxially positioned with the screw shaft, wherein outer diameters of the nut and pressure application shaft are respectively smaller than an inner diameter of the rotary shaft to form a direct moving guide part, and wherein the direct moving guide part is movable on an inner periphery surface of the rotary shaft and a rotary force of the rotary shaft of the motor is converted into a reciprocating motion, it is possible to use a small-sized motor having a rotary shaft thereof inner diameter of which is reduced as much as possible, and possible to reduce the entire length of the driving unit of the welding equipment.

Further, since a bearing of the direct moving guide part is disposed on a front wall of the motor and the direct moving guide part is slidable on the inner surface of the bearing, not only the length of the pressure application shaft can be reduced but also the driving unit of a welding equipment can be reduced in length and small-sized.

Further, since the screw shaft provided substantially integrally with the rotary shaft of the motor by fixing the screw shaft to the rotary shaft of the motor utilizing friction force, the screw and the pressure application shaft can be easily fixed to each other without requiring a troublesome operation such as shrinkage fit or cold shrinkage fit.

Still further, since the machining part is formed at the rear end of the screw shaft for manually turning the screw shaft, it is possible to move the pressure application shaft to an desired standby position when the motor is in troubled.

What is claimed is:

1. A driving unit of a welding equipment provided with a pressure application shaft that is driven by a motor comprising:

a rotary shaft of the motor formed of a hollow shaft;

a screw shaft fixed to the rotary shaft and positioned inside the rotary shaft;

a nut fixed to the pressure application shaft, said nut being screw engaged with a screw provided on the screw shaft, wherein the rotary shaft of the motor is substantially coaxially positioned with the screw shaft;

wherein outer diameters of the nut and pressure application shaft are respectively smaller than an inner diameter of the rotary shaft, and the outer diameter of the nut is the same as or smaller than the outer diameter of the pressure application shaft so that a direct moving guide part is formed by the nut and the pressure application shaft; and wherein the direct moving guide part formed by the nut and the pressure application shaft is movable on an inner annular peripheral surface of the rotary shaft, and a rotary motion of the rotary shaft of the motor is converted into a reciprocating motion of the pressure application shaft via the screw shaft and the nut.

2. The driving unit of a welding equipment according to claim 1, wherein the pressure application shaft is formed of a hollow shaft, and the nut is fixed to an end of the pressure application shaft so that the nut is substantially integral with the pressure application shaft.

3. The driving unit of a welding equipment according to claim 1, wherein the pressure application shaft is formed of a hollow shaft, and screw threads are formed on the inner periphery of the pressure application shaft at the end thereof as the nut is provided integrally with the pressure application shaft.

4. The driving unit of a welding equipment according to claim 1, wherein the pressure application shaft is formed of a hollow shaft and the nut is fixed to an inner periphery of the pressure application shaft at the end thereof so that the nut is substantially integral with the pressure application shaft.

5. The driving unit of a welding equipment according to claim 1, wherein a bearing of the direct moving guide part is disposed on a front wall of the motor and the direct moving guide part is slidable on the inner surface of the bearing.

6. The driving unit of a welding equipment according to claim 1, wherein the screw shaft is provided substantially integrally with the rotary shaft of the motor by fixing the screw shaft to the rotary shaft of the motor utilizing friction force.

7. The driving unit of a welding equipment according to claim 1, further comprising a machining part formed on the end of the screw shaft opposite to the output side of the rotary shaft of the motor on which a manually operating handle is mounted.

8. A driving unit of a welding equipment provided with a pressure application shaft that is driven by a motor comprising:

a rotary shaft of the motor formed of a hollow shaft;

a screw shaft fixed inside the rotary shaft;

a nut fixed to the pressure application shaft, said nut being screw engaged with a screw provided on the screw shaft, and the rotary shaft of the motor being substantially coaxially positioned with the screw shaft;

a driven part provided on the screw shaft and positioned between the rear of a body of the motor and the front of a position detector for transmitting the torque of the motor; and a manually operating driving part positioned eccentrically from the screw shaft for transmitting a turning torque to the driven part;

wherein outer diameters of the nut and pressure application shaft are respectively smaller than an inner diameter of the rotary shaft to form a direct moving guide part, and the direct moving guide part is movable on an inner peripheral surface of the rotary shaft and a rotary motion of the rotary shaft of the motor is converted into a reciprocating motion.

9. The driving unit of a welding equipment according to claim 8, wherein the driven part is formed of a gear, and further comprising a machining part that is manually operable and is formed in a gear of the driving part connected to the gear of the driven part directly or by way of a serrated toothed belt.

10. The driving unit of a welding equipment according to claim 8, wherein the driven part is formed of a gear, the driving part meshing with the gear of the driven part is formed of a gear, and further comprising a standby unit formed of an elastic body for displacing the position of the gear of the driving part, wherein the gear of the driving part is rendered standby when the motor is operated.

11. The driving unit of a welding equipment according to claim 8, wherein the driven part is formed of a gear, the driving part meshing with the gear of the driven part is formed of a gear, and further comprising a guide shaft provided integrally with the gear of the driving part, wherein the gear of the driving part is capable of removal from the motor by the guide shaft when the motor operates.

12. A driving unit for welding equipment driven by a motor comprising:

a hollow rotary shaft of the motor;

a force application shaft capable of axial movement;

a screw shaft fixed to said rotary shaft and positioned coaxially within said rotary shaft; and a nut fixed to said force application shaft, at least a portion of said nut being positioned coaxially inside said rotary shaft, an inner periphery of said nut threadably engaging an outer periphery of said screw shaft;

wherein said motor operates to rotate said rotary shaft and said screw shaft to advance or retract said force application shaft in an axial direction.

13. The driving unit for welding equipment according to claim 12, wherein outer diameters of said nut and said force application shaft are less than an inner diameter of said rotary shaft.

14. The driving unit for welding equipment according to claim 12, wherein said motor includes a winding and a rotor magnetic pole for driving said rotary shaft.

15. The driving unit for welding equipment according to claim 12, wherein said nut and said force application shaft comprise a single integral member.

16. The driving unit for welding equipment according to claim 12, further comprising a machining part formed on an end of said screw shaft opposite to an output side of said rotary shaft of said motor, on which a manually operating handle is mounted.

17. The driving unit for welding equipment according to claim 12, further comprising a driven part on the screw shaft positioned between a rear of a body of said motor and a front of a position detector for transmitting torque of said motor.

18. The driving unit for welding equipment according to claim 17, further comprising a manually operating driving part that is positioned eccentrically from said screw shaft for transmitting a turning torque to said driven part.

19. The driving unit for welding equipment according to claim 18, wherein said driven part is formed as a driven gear and said driving part is formed as a driving gear.

20. The driving unit for welding equipment according to claim 19, further comprising a guide shaft integral with the driving gear and capable of removal during operation of said motor.

* * * * *

UNITED STATES PATENT AND TRADEMARK OFFICE
CERTIFICATE OF CORRECTION

PATENT NO. : 6,223,971 B1
DATED : May 1, 2001
INVENTOR(S) : Yoshio Sato

It is certified that error appears in the above-identified patent and that said Letters Patent is hereby corrected as shown below:

Title page,
Item [30], please replace with the following:
-- [30] Foreign Application Priority Data
Nov. 24, 1999 (JP) 11-332624
Nov. 24, 1999 (JP) 11-332625
Jan. 6, 2000 (JP) 2000-000744 --.

Signed and Sealed this

Fifteenth Day of February, 2005

JON W. DUDAS
*Director of the United States Patent and Trademark Office*